United States Patent Office 2,911,405
Patented Nov. 3, 1959

2,911,405
METHOD FOR PRODUCING BINARY POLY SULFUR GROUP COMPOUNDS OF MORPHOLINE AND/OR PIPERIDINE

Earl C. Gregg, Jr., Cuyahoga Falls, Ohio, assignor to The B. F. Goodrich Company, New York, N.Y., a corporation of New York No Drawing. Application May 17, 1956
Serial No. 585,389

9 Claims. (Cl. 260—247.1)

This invention relates to a novel method for the preparation of morpholine or piperidine compounds containing sulfur group elements. More particularly, the present invention relates to a method for the preparation of morpholine or piperidine compounds containing increased amounts of sulfur group elements and in high yields.

Morpholine and piperidine sulfides and the like are useful materials for curing hot milled rubbery compositions reinforced with silicon and oxygen containing pigments such as arc silica, fume silica, and, preferably, "Monox" (a disproportionation product of SiO gas having the formula $(SiO_2)_x(Si)_y$ where $x$ and $y$ are integers).

The higher sulfides, e.g. the tetra sulfides and the like, of these compounds are generally more desirable due to their increased stability over long periods of time. However, the higher sulfides are obtained in the form of oily mixtures of varying and complex nature, and from which it is difficult to extract a desired sulfide in a practical yield. Moreover, it is not possible to obtain directly in economical yields by known methods a particular higher sulfide. It is much preferred, when compounding rubbery compositions, to work with solid materials and, furthermore, to use generally a single higher sulfide such as substantially pure, solid, stable bis(N,N'tetrathio)-morpholine to provide vulcanizates exhibiting superior physical properties as compared to other curing agents or as compared to equivalent or larger amounts of corresponding lower sulfides.

For example, the way to prepare morpholine and piperidine disulfides is to react at a low temperature, i.e. about 15° C., the morpholine or piperidine compound as the case may be, with sulfur monochloride in heptane and then to add to the reaction mixture an aqueous solution of alkali in order to release the amine from the hydrochloride of the amine formed during the reaction and to permit the reaction to go to completion. After filtering and recrystallization of the product the yield obtained averages about 67% of theory. The reaction which occurs when morpholine and sulfur monochloride are used can be represented as follows:

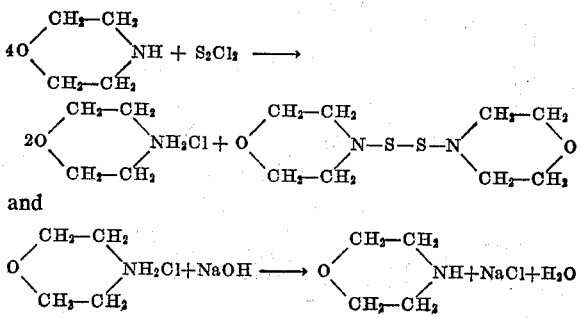

The resulting product is called bis(N,N'-dithio)morpholine. The corresponding bis(N,N'-monothio)morpholine compound can be made in a similar manner by substituting sufur dichloride for the sulfur monochloride.

To convert bis(N,N'-dithio)morpholine or lower sulfide to compounds having a higher sulfur content, for example, to the bis(N,N'-tetrathio)morpholine compound,

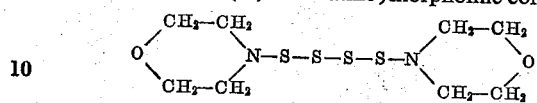

it is customary to react the dithio compound with elemental sulfur and the like at elevated temperature. However, the yields of crystalline bis(N,N'-tetrathio)morpholine obtained are only about 6 to 10% of the theoretical yield. Moreover, considerable oily or syrupy by-products are also obtained to contaminate the product. Such process, thus, is not economical for large scale operations.

It, therefore, is a primary object of the present invention to provide a method for readily producing increased yields of higher sulfides and the like of morpholine and piperidine compounds.

It is another object of this invention to provide a method for increasing the yields of higher crystalline sulfides and the like of morpholine and piperidine compounds with reduction in the amount of by-products produced.

These and other objects and advantages of the present invention will become more apparent to those skilled in the art from the following detailed description and examples.

According to the present invention it now has been discovered that a minor amount of a primary aliphatic amine having at least one $NH_2$ group attached to a carbon atom having at least one hydrogen atom will serve to catalyze the morpholine and piperidine sulfide compounds and sulfur reaction mixture to provide higher sulfides, and especially crystalline sulfides, of said compounds and a reduction in by-products. The yields obtained will vary from about 16 to 82% or more of the theoretical yield.

The catalyst is a primary aliphatic amine having at least one $NH_2$ group attached to a carbon atom having at least one hydrogen atom. Preferred primary aliphatic amines are those which have sterically unhindered $NH_2$ groups, i.e. the $NH_2$ group is attached to a carbon atom having at least two hydrogen atoms, $R-CH_2-NH_2$, where R is an organic radical. On the other hand, primary aliphatic amines in which the amine group is attached to a tertiary carbon atom, i.e.

where R is methyl, ethyl or other organic group are unsatisfactory. Likewise, secondary and tertiary aliphatic amines do not seem to catalyze the reaction and also are not useful.

The useful primary aliphatic amines of the present invention, thus, can have the formula

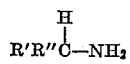

in which R' and R'' can be hydrogen or an organic group. The organic groups can include alkoxy, azo or amine groups, can be hydrocarbon, can be straight chain or branched, can be aliphatic, aromatic, cyclic or heterocyclic, and can include any constituent which will not adversely affect the results desired. The amines, thus, comprise primary aliphatic amines, diamines, triamines, tetraamines, polyamines and so forth so long as they contain at least one $NH_2$ group attached to a carbon atom having at least one hydrogen atom.

Examples of the useful amines included within the above definition are methylamine, ethylamine, n-butylamine, sec-butylamine, isobutylamine, amylamine, heptylamine, alphamethyl-heptylamine, octylamine, decylamine, hexadecylamine, ethylene diamine, 1,2-propane diamine, 1,3-propane diamine, 1,4-butane diamine, 1,6-hexane diamine, triethylenetetramine, diethylenetriamine, benzylamine, oleylamine, undecylenylamine, 2(N-morphlyl)ethylamine, 2(N-piperidyl)ethylamine, 3-ethyl hexylamine, 2(2-thienyl)ethylamine, cyclohexylamine and the like. Still other primary aliphatic amines having the aforementioned structure can be employed. These amines can be used singly or in mixtures. Of the various useful amines those having high boiling points are preferably employed since they remain in the reaction mixture and do not readily volatilize from the same.

The amines are used in the reaction in a minor molar amount as compared to the morpholine or piperidine sulfide initially employed. Small amounts of the amine will produce improved yields. However, if the amount employed is too small, the yields of the desired compound will be too small to be practicable and a preponderantly large amount of by-products will be produced. On the other hand, if the amine is used in an excessive amount, a large amount of free sulfur and a small amount of the desired sulfide will be obtained. Moreover, in such cases the original compound may decompose to produce morpholine, piperidine or other materials. Furthermore, the amount of amine used will vary with the molecular weight of the amine, the number of $NH_2$ groups present, the number of NH groups, if any, present and which may contribute to the basicity of the $NH_2$ group, and the degree of substitution of the carbon atom attached to the $NH_2$ group, that is, whether the carbon atom contains one, two, or three hydrogen atoms.

The sulfide type compound which is used as the starting material in the practice of the method of the present invention can be any morpholine or piperidine sulfide, selenide, or telluride compound which it is desired to treat to increase the number of sulfur, selenium and/or tellurium atoms in the sulfide, selenide and/or telluride linkage. Such compounds have the formula:

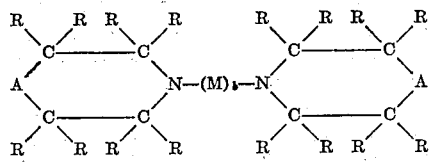

where A is selected from the group consisting of oxygen and

radicals, where R is selected from the group consisting of hydrogen and alkyl radicals, where M is selected from the group consisting of sulfur, selenium and tellurium and mixtures thereof and where $b$ is at least one. Examples of useful starting materials falling within the scope of the above formula are bis(N,N'-monothio)morpholine, bis(N,N'-dithio)morpholine, bis(N,N'-dithio)2-methyl morpholine, bis(N,N'-dithio)3-ethyl morpholine, bis(N,N'-dithio)2,3-dimethyl morpholine, bis(N,N'-dithio)2-methyl-3-ethyl morpholine, bis(N,N'-trithio)morpholine, bis(N,N'-trithio)3-methyl morpholine, bis(N,N'-trithio)2,3-dimethyl morpholine, bis(N,N'-tetrathio)morpholine, bis(N,N'-tetrathio)2-ethyl morpholine and other bis(N,N'-polythio)morpholines and similar alkyl morpholines and the like. Still other examples of useful starting materials that can be employed are Bis(N,N'-monoseleno)2-methyl morpholine,
Bis(N,N'-diseleno)morpholine,
Bis(N,N'-diseleno)2,3-diethyl morpholine,
Bis(N,N'-triseleno)3-propyl morpholine,
Bis(N,N'-tetraseleno)morpholine, and other bis(N,N'-polyseleno)morpholines and similar alkyl morpholines;
Bis(N,N'-monotelluro)morpholine,
Bis(N,N'-ditelluro)morpholine,
Bis(N,N'-tritelluro)2-methyl morpholine,
Bis(N,N'-tritelluro)2-ethyl-3-hexyl morpholine,
Bis(N,N'-tritelluro)2-ethyl morpholine,
Bis(N,N'-tetratelluro)morpholine and other bis(N,N'-polytelluro)morpholines and similar alkyl morpholines;
Bis(N,N'-monothio)piperidine,
Bis(N,N'-dithio)piperidine,
Bis(N,N'-dithio)2-ethyl piperidine,
Bis(N,N'-dithio)2-ethyl-3-butyl piperidine,
Bis(N,N'-trithio)2-methyl piperidine,
Bis(N,N'-tetrathio)piperidine,
Bis(N,N'-polythio)piperidines and similar alkyl piperidines;
Bis(N,N'-monoseleno)piperidine,
Bis(N,N'-diseleno)piperidine,
Bis(N,N'-triseleno)2-methyl piperidine,
Bis(N,N'-tetraseleno)2,3-dimethyl piperidine and bis(N,N'-polyseleno)piperidines and similar alkyl piperidines; and
Bis(N,N'-monotelluro)piperidine,
Bis(N,N'-ditelluro)piperidine,
Bis(N,N'-ditelluro)3-ethyl piperidine,
Bis(N,N'-tritelluro)3-methyl piperidine,
Bis(N,N'-tritelluro)2,3-dimethyl piperidine,
Bis(N,N'-tetratelluro)piperidine,
Bis(N,N'-tetratelluro)2,3-diethyl piperidine and other bis(N,N'-polytelluro)piperidines and similar alkyl piperidines and other mixed compounds such as piperidyl morphlyl N,N'-disulfide or piperidine-1(morphlyl-N-dithio).

Still other compounds similar to the above group can be used. Mixtures of these compounds can also be employed.

Sulfur, selenium or tellurium are employed in the reaction in an amount of at least about 1 mole for each mole of the morpholine or piperidine polysulfide, -selenide or -telluride compound being treated. Preferably, a slight excess of sulfur, etc. over that desired in the final product is employed. If it is desired to convert the starting materials to higher sulfides and the like, additional moles of the element to be introduced are required. The relationship can be shown by the following equations where M represents the morpholine nucleus and P represents the piperidine nucleus:

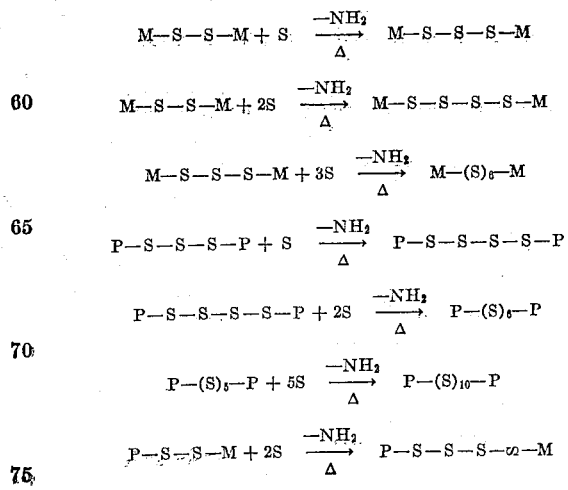

The sulfur, selenium and tellurium can also be used as mixtures, either as physical mixtures or in the form of compounds, i.e. SeS, SeS$_2$, TeS, and the like to introduce mixed S and Se, etc. groups into the molecule.

Times and temperatures will vary somewhat with the reactants used, degree of agitation, the amount of product desired, and so forth. In general, the time may vary from about ½ to 5 hours but is usually within the range of from about ½ to 2 hours. Temperatures may vary from about 110 to 150° C., about 115 to 140° C. being preferred. Substantially longer or shorter times or higher or lower temperatures should desirably be avoided as they may produce undesirable side reactions or cause decomposition of the product sought.

The reaction is preferably carried out in an autoclave or in apparatus using a reflux condenser or other apparatus which prevents escape of the vapors of the amine and so forth. While open beakers or other pots can be employed, they are not too desirable since they may permit escape of the amine if volatile or require that the amine be added slowly over an extended period of time to obtain the best results. Moreover, the reactants should be heated under substantially anhydrous conditions. It is even more preferred that the reaction conditions be essentially anhydrous or that the reaction mass essentially be free of water or water vapor.

The following examples will serve to illustrate the invention with more particularity to those skilled in the art:

Example I

Approximately 1 mol of bis(N,N'-dithio)morpholine was mixed with 2 mols of sulfur in a beaker. The mixture was then heated to 125° C. for about 80 minutes. At the beginning, 5% by weight, based on the weight of dithiomorpholine compound, of an amine mix was added to the mixture with stirring. The amine mix used comprised about 30% 4,5-dimethyl hexylamine, 30% 3,5-dimethyl hexylamine, 15% 5-methyl heptylamine, 15% 3,4-dimethyl hexylamine, 5% 5,5-dimethyl hexylamine and 5% miscellaneous octylamines. As the reaction progressed the pale straw color of the mixture changed to a dark brown color. The reaction which occurred can be represented as follows, M being the morpholine nucleus:

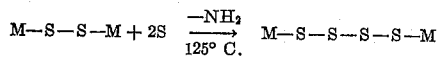

At the end of the reaction the mixture was cooled to about 85° C. and diluted with isopropyl acetate and filtered to remove any free sulfur. The filtrate was then allowed to cool and to permit evaporation of the solvent in a circulating air dryer at room temperature. The crystals obtained were washed with cold isopropyl acetate to remove any oils on their surfaces. Then, the crystals were dissolved in hot solvent and the solution filtered hot and permitted to slowly cool to recrystallize the product. The recrystallized product was filtered, dried and pulverized. Analysis of the product showed it to be bis(N,N'-tetrathio)morpholine. The yield of the tetrathiomorpholine compound was 36% of the theoretical yield.

When the same procedure was followed except that 7½% by weight, based on the weight of the dithiomorpholine compound, of the amine mix was used, the yield of the tetrathiomorpholine compound was only 8% of the theoretical yield and a large amount of free sulfur was obtained. This indicates that the concentration of catalyst markedly affects the yield as too much catalyst may actually retard the reaction, may not actually be catalytic for the reaction desired, or may tend to produce side reactions.

Repeating the procedure of the first paragraph of this example but omitting sulfur produced no change in the straw color of the mixture and no bis(N,N'-tetrathio)-morpholine was isolable. This result shows that sulfur is necessary with the amine catalyst to produce a tetrathio compound of morpholine and that the amine itself cannot convert the dithio compound into a trithio, tetrathio or higher thio morpholine compound.

Example II

The method of this example was the same as that of the first paragraph of Example I, above, except that triethylenetetramine was used in place of the amine mix and was used in varying amounts, and a flask employing a reflux condenser was used. The amounts of the amine catalyst employed and the yields obtained are shown below:

| Percent by weight of triethylenetetramine based on the weight of bis(N,N'-dithio)morpholine | Yield of bis(N,N'-tetrathio)-morpholine, percent of theory |
|---|---|
| 0.5 | 16 |
| 1.0 | 30 |
| 1.25 | 42 |
| 1.50 | 32 |
| 2.00 | 7 |
| 2.50 | 6.5 |

The above results show that other amines, and even very small amounts of the amines, will produce greatly increased yields of higher thio morpholine compounds. However, as the concentration of the amine is increased, the catalytic activity drops off quickly with the production of an excessive amount of free sulfur so that too much amine will provide little or no improvement in results as compared to a reaction in which no amine is present. This example also shows the advantage of using a reflux condenser to prevent loss of the amine catalyst.

Example III

The method of this example was similar to that of the first paragraph of Example II, above, except that the reaction was conducted in a glass lined, jacketed autoclave equipped with a feed funnel, a Thermowell, a "Pfaudler T" agitator and means to heat with steam. Moreover, the amine was added to the molten dithiodimorpholine-sulfur mixture over a period of five minutes, a slight excess (105% of the theoretical quantity) of sulfur was used and the temperature employed was varied somewhat. The results obtained are as follows:

| Percent by weight of triethylenetetramine based on the weight of bis(N,N'-dithio)-morpholine. | Reaction Temp., ° C. | Yield of bis(N,N'-tetrathio)-morpholine, percent of theory |
|---|---|---|
| 1.25 | 116 | 54 |
| 1.25 | 125 | 82 |
| 2.5 | 125 | 6.5 |

The above data show the desirability of conducting the reaction in a closed system where the amine concentration is maintained at a high level. The data also show that variations in temperature will affect the yields obtained and that high concentrations of the amine even in an autoclave will not produce the desired results as pointed out in Example II, above.

Example IV

The method of this example was the same as that of the first paragraph of Example I, above, except that the reaction temperature varied from about 100 to 125° C. and isooctylamine (CH$_3$(CH$_2$)$_5$CH(CH$_3$)NH$_2$) was used in place of the amine composition. The yield of bis-(N,N'-tetrathio)morpholine was about 54% of the theoretical yield.

Example V

The method of this example was the same as that of the first paragraph of Example I, above, except that other compounds were tried as catalysts. The results obtained are shown below:

| Compound | Yield of bis(N,N'-tetrathio)-morpholine, percent of theory |
|---|---|
| t-octyl amine[(CH₃)₂CNH₂(CH₂)₄CH₃] | 7 |
| morpholine | None |
| pyridine | None |
| piperidine | 7 |
| diethanol amine [HN(CH₂CH₂OH)₂] | 9 |
| triethanol amine[N(CH₂CH₂OH)₃] | 7 |
| MgO | None |
| Zinc acetate | None |
| I₂ | None |
| Iron chloride-iron oxide mixture | None |
| Tetramethyl thiuram disulfide [((CH₃)₂NCS)₂S₂] | None |

The results obtained show that secondary amines, tertiary amines, primary amines in which the carbon atom attached to the NH₂ group is completely substituted and other materials do not provide any results or do not show any catalytic activity by increasing the yields of the tetrathiodimorpholine compound desired.

In summary, the present invention teaches that the reaction of a sulfur group element with a morpholine or piperidine sulfide and the like compound can be catalyzed by the use of a minor amount of a primary aliphatic amine in which at least one NH₂ group is attached to a carbon atom having at least one hydrogen atom to provide high yields of higher sulfides, etc. The present invention, thus, provides an economical method for converting lower thiodimorpholines and dipiperidine compounds and the like and their corresponding seleno and telluro compounds to higher thiodimorpholines and the like with very large increases in the yields obtained.

What is claimed is:

1. The method which comprises heating to a temperature of about 110 to 150° C. for about ½ to 5 hours under substantially anhydrous conditions sulfur, a compound having the formula

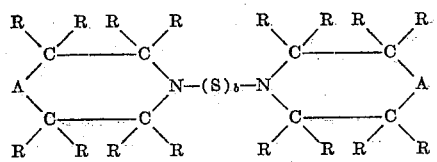

where A is selected from the group consisting of oxygen and

radicals, where R is selected from the group consisting of hydrogen and the lower alkyl radicals, and where $b$ is at least the number one, the mols of said sulfur being at least equal to the mols of said compound and, as a catalyst, at least one amine having at least one —NH₂ group attached to a carbon atom having at least one hydrogen atom and being selected from the group consisting of (A) alkyl amines, alkylene diamines, polyalkylene polyamines and alkenyl amines, said amines in subgroup (A) having up to and including 18 carbon atoms, and (B) phenyl substituted lower alkyl amines, —N-morpholyl substituted lower alkyl amines, —N-piperydyl substituted lower alkyl amines, thenyl substituted lower alkyl amines and cyclohexyl amine, said amine catalyst being used in a minor molar amount based on the weight of said compound and sufficient to provide improved yields of said compound having an appreciable increase in the number of sulfur atoms in said compound without producing undesirably large amounts of by-products and of sulfur.

2. The method of making 4,4'-polythiodimorpholine compounds comprising heating under substantially anhydrous conditions sulfur and a morpholyl sulfide compound having the formula

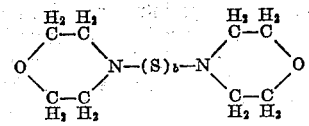

where $b$ is at least the number one, the mols of said sulfur being at least equal to the mols of said compound, and, as a catalyst, at least one high boiling point amine having at least one —NH₂ group attached to a carbon atom having at least one hydrogen atom and being selected from the group consisting of (A) alkyl amines, alkylene diamines, polyalkylene polyamines and alkenyl amines, said amines in subgroup (A) having up to and including 18 carbon atoms, and (B) phenyl substituted lower alkyl amines, —N-morpholyl substituted lower alkyl amines, —N-piperydyl substituted lower alkyl amines, thenyl substituted lower alkyl amines and cyclohexyl amine, said amine catalyst being used in a minor molar amount based on the weight of said compound and sufficient to provide improved yields of said compound having an appreciable increase in the number of sulfur atoms in said compound without producing undesirably large amounts of by-products and of sulfur.

3. The method for producing high yields of bis(N,N'-tetrathio)morpholine which comprises reacting under essentially anhydrous conditions for from about ½ to 2 hours at a temperature of from about 115 to 140° C. about at least 2 mols of sulfur, about 1 mol of bis(N,N'-dithio)morpholine, and isooctylamine, said isooctylamine being present in a minor amount at least sufficient to materially increase the yield of said tetrathio compound and up to not over about 5% by weight based on the weight of said dithio compound.

4. The method for producing high yields of bis(N,N'-tetrathio)morpholine which comprises reacting under essentially anhydrous conditions for from about ½ to 2 hours at a temperature of from about 115 to 140° C. about at least 2 mols of sulfur, about 1 mol of bis(N,N'-dithio)morpholine, and triethylenetetramine, said triethylenetetramine being present in a minor amount at least sufficient to materially increase the yield of said tetrathio compound and up to not over about 1.5% by weight based on the weight of said dithio compound.

5. The method for producing high yields of bis(N,N'-tetrathio)morpholine which comprises reacting under essentially anhydrous conditions for from about ½ to 2 hours at a temperature of from about 115 to 140° C. about at least 2 mols of sulfur, about 1 mol of bis(N,N'-dithio)morpholine, and an amine comprising a mixture of dimethyl hexylamines, methyl heptylamine and octylamines, said amine being present in a minor amount at least sufficient to materially increase the yield of said tetrathio compound and up to not over about 5% by weight based on the weight of said dithio compound.

6. The method according to claim 1 where said compound is bis(N,N'-dithio)morpholine.

7. The method according to claim 1 where said amine is isooctylamine.

8. The method according to claim 1 where said amine is triethylenetetramine.

9. The method according to claim 1 where said amine is a mixture of dimethyl hexylamines, methyl heptylamine and octylamines.

References Cited in the file of this patent

UNITED STATES PATENTS

| | | |
|---|---|---|
| 2,237,625 | Olin | Apr. 8, 1941 |
| 2,259,164 | Jones | Oct. 14, 1941 |
| 2,351,657 | Bayes | June 20, 1944 |
| 2,779,761 | Kibler | Jan. 29, 1957 |